United States Patent [19]

Steger et al.

[11] 4,253,623

[45] Mar. 3, 1981

[54] LOCKBAR RELEASE FOR INERTIA LOCKING SEAT BELT RETRACTOR

[75] Inventors: Charles B. Steger, Warren; Kenneth H. Reid, Mt. Clemens, both of Mich.

[73] Assignee: General Motors Corporation, Detroit, Mich.

[21] Appl. No.: 93,936

[22] Filed: Nov. 13, 1979

[51] Int. Cl.³ .................. A62B 35/02; B65H 75/48
[52] U.S. Cl. ....................... 242/107.4 A; 280/806
[58] Field of Search .............. 242/107.4 R–107.4 E; 280/801–808; 297/469, 475–480

[56] References Cited

U.S. PATENT DOCUMENTS

| | | | |
|---|---|---|---|
| 2,708,555 | 5/1955 | Heinemann et al. | 242/107.4 A |
| 3,273,822 | 9/1966 | Merrell et al. | 242/107.4 C |
| 3,312,451 | 4/1967 | Davis | 242/107.4 R X |
| 3,503,571 | 3/1970 | Martin | 242/107.4 A |
| 3,695,545 | 10/1972 | Peters | 242/107.4 A |
| 3,771,814 | 11/1973 | Hahn | 242/107.4 R X |
| 4,040,645 | 8/1977 | Giffen et al. | 242/107.4 A X |

OTHER PUBLICATIONS

"Seat Belt Systems for the Future", E. Nichol, Report on the Third International Technical Conference on Experimental Safety Vehicles, Wash., D.C. May 30–Jun. 2, 1972.

*Primary Examiner*—John M. Jillions
*Attorney, Agent, or Firm*—Charles E. Leahy

[57] ABSTRACT

A seat belt retractor has a belt reel rotatably mounted on a support member which is mounted on the housing by a pivot axis spaced from the reel shaft. A lockbar is pivotally mounted on the housing for movement between a locking position engaging a ratchet plate attached to the reel and an unlocked position disengaged from the ratchet plate to permit belt unwinding. A latch acts between the reel and the support member to normally latch the reel support member with the housing at a position establishing the reel ratchet plate in proximity with the lockbar for the selective locking engagement by the lockbar. The latch may be manually disengaged to permit the belt load acting on the reel to pivot the support member about the pivot axis and thereby carry the reel and ratchet plate away from locking engagement with the lockbar to permit belt unwinding irrespective of the lockbar being located at the locking position.

2 Claims, 4 Drawing Figures

LOCKBAR RELEASE FOR INERTIA LOCKING SEAT BELT RETRACTOR

The invention relates to a seat belt retractor of the type in which inertia sensing member engages a lockbar with a belt reel and more particularly provides mechanism by which the reel may be bodily shifted away from the lockbar to release the reel for belt unwinding rotation.

BACKGROUND OF THE INVENTION

Vehicle occupant restraint belt retractors have heretofore been provided with an inertia responsive pendulum or the like for moving a lockbar into engagement with a toothed ratchet plate attached to the belt reel so that the occupant is restrained in the seat. The locking engagement between the lockbar and the ratchet plate teeth is effectively maintained for as long as a load is imposed on the belt even though inertia stimulus is terminated. When the load is removed from the belt, a slight belt rewinding rotation by the windup spring permits gravity to disengage the lockbar from the ratchet plate.

It is known to use the aforedescribed seat belt retractor in a seat belt system of the type having one end of the belt connected to the vehicle door so that the belt will be automatically moved to an unrestraining position when the door is opened and return to the restraining position about the occupant when the door is closed. It has been recognized as desirable to provide a buckle in the belt so that the belt can be disconnected to permit opening of the door. In the alternative, it has been recognized as desirable to provide a handle or the like which is manually operable to forcibly disengage the lockbar from the ratchet plate so that the belt may be unwound from the reel to permit opening movement of the door. Copending patent application, Ser. No. 044,753, Bernard J. Finn et al, filed June 1, 1979, is an example of such a retractor.

SUMMARY OF THE INVENTION

The present invention provides a new and improved manually operated mechanism by which the reel and the associated ratchet plate may be bodily shifted away from locking engagement with the lockbar to release the reel for belt unwinding rotation and opening movement of the door.

According to the present invention a seat belt retractor has a belt reel rotatably mounted on a support member which is attached to the housing by a pivot axis spaced from the reel shaft. A lockbar is pivotally mounted on the housing for movement between a locking position engaging a ratchet plate attached to the reel and an unlocked position disengaged from the ratchet plate to permit belt unwinding. A latch acts between the reel and the support member to normally latch the reel support member with the housing at a position establishing the reel ratchet plate in proximity with the lockbar for selective locking engagement by the lockbar. The latch may be manually disengaged to permit the belt load acting on the reel to pivot the support member about the pivot axis and thereby carry the reel and ratchet plate away from locking engagement with the lockbar to permit belt unwinding irrespective of the lockbar being located at the locking position.

Accordingly, the object, feature and advantage of the invention resides in the mounting of a belt reel upon a pivotally movable support member which may be manually unlatched to permit bodily shifting movement of the reel away from engagement with a lockbar to permit belt unwinding.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
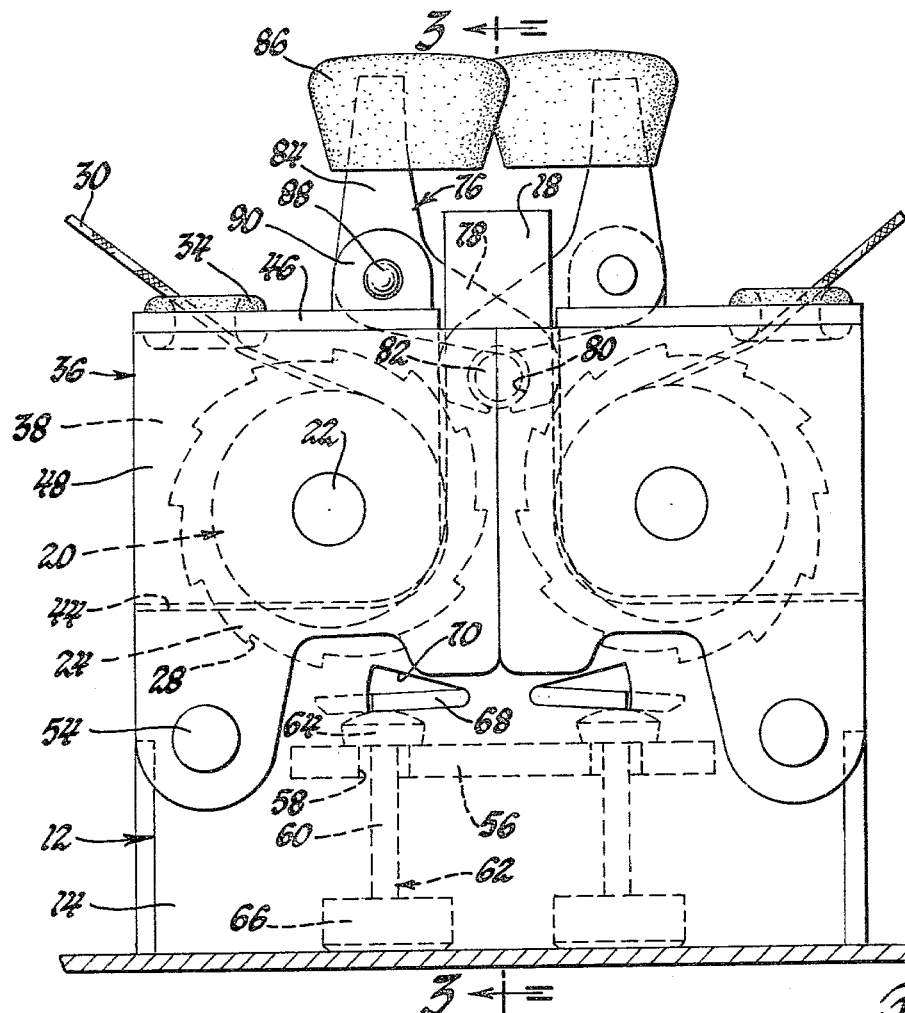
FIG. 1 is a side elevation view of the first embodiment of the invention showing the reel established in the normal position in proximity with the lockbar.
Figure 2:
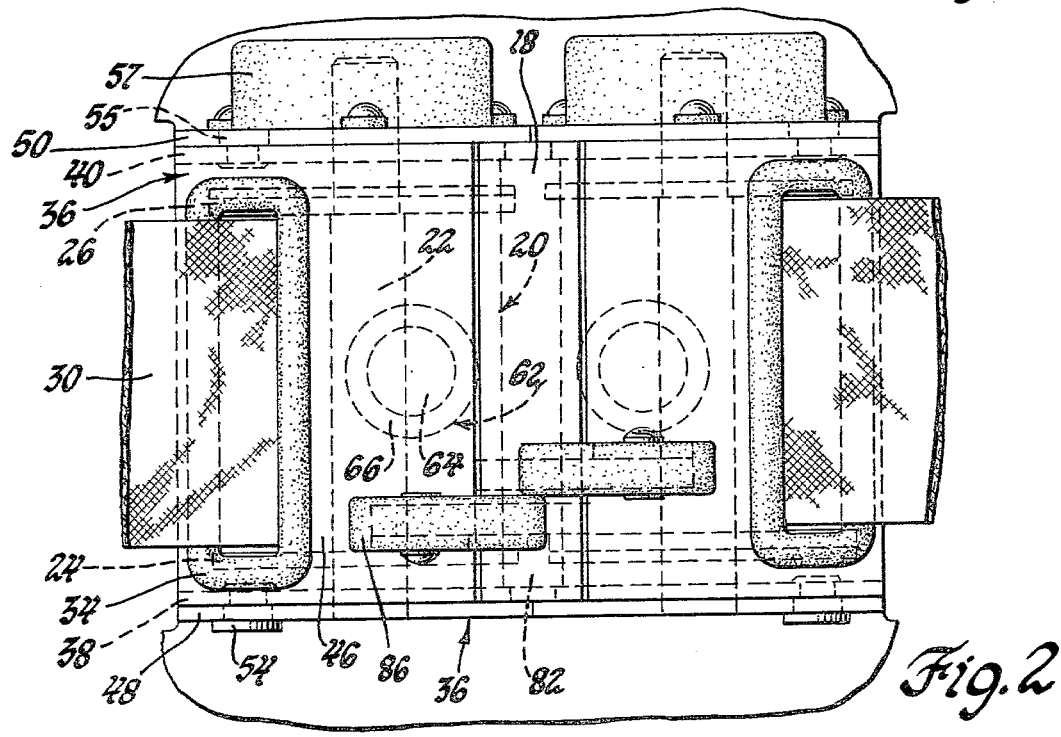
FIG. 2 is a plan view of the retractor assembly of FIG. 1.

Referring to FIGS. 1 and 2 of the drawings, a pair of side-by-side mounted restraint belt retractors are shown. The retractors are adapted for mounting on the transmission tunnel of a vehicle body and for respectively winding shoulder belts having their outboard ends mounted respectively on the driver and passenger doors so that the belts are automatically moved between restraining and unrestraining positions upon movement of the doors.

Both retractors are similarly constructed and reference numerals are assigned only to the retractor on the left-hand side of FIGS. 1 and 2.

Figure 3:
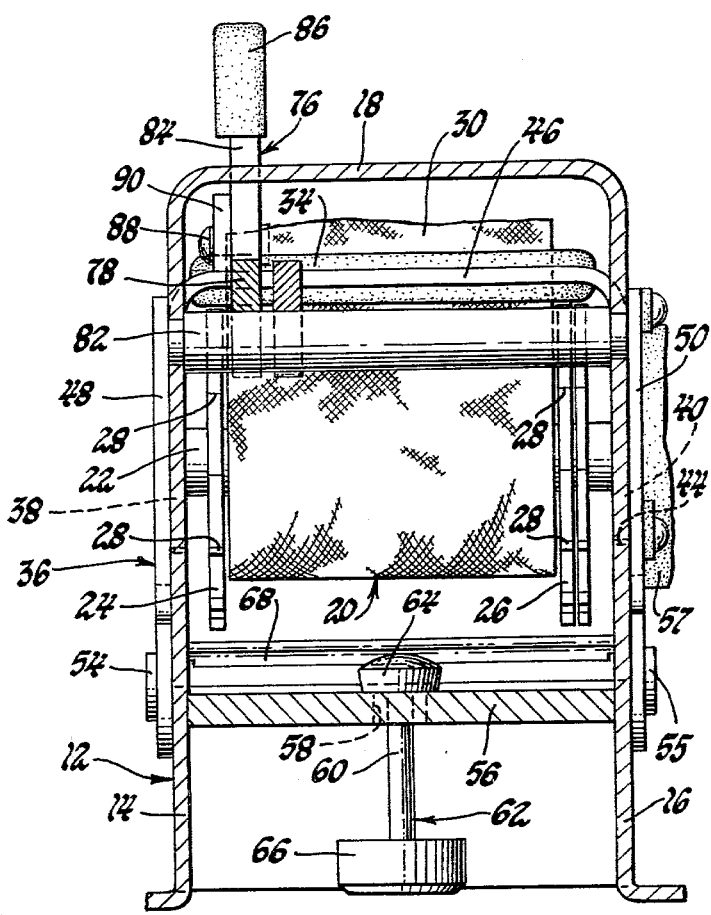
FIG. 3 is a sectional view taken in the direction of arrows 3—3 of FIG. 1.

Referring to FIGS. 1, 2 and 3 it is seen that the retractor housing 12 includes a pair of spaced apart side walls 14 and 16 which are joined by an integral connecting strap 18. A belt reel generally designated 20 is rotatably mounted between the side walls 14 and 16 by a reel shaft 22. The reel shaft 22 has ratchet plates 24 and 26 attached to the ends thereof. The ratchet plates have circumferentially spaced teeth 28 facing in the belt unwinding direction. The restraint belt 30 is attached to the reel shaft 22 between the ratchet plates 24 and 26 and extends outwardly from the retractor through a plastic belt guide 34 for positioning about the seated occupant.

A downwardly opening U-shaped stamped steel support member 36 is provided for movably mounting the reel 20 on the retractor housing 12. The support member 36 includes a pair of laterally spaced downturned legs 38 and 40 which have the same lateral spacing as the housing side walls 14 and 16 and fit within a cutout 44 in the housing side walls 14 and 16. The support member 36 also has an integral top wall 46 which connects the legs 38 and 40. As best seen in FIG. 3, a pair of laterally spaced pivot plates 48 and 50 overlie and are respectively welded to the support member legs 38 and 40. Pivot pins 54 and 55 extend through aligned apertures of the pivot plates 48 and 50 and the housing side walls 14 and 16 to mount the support member 36 for pivotal movement between the normal position of FIG. 1 and the position of FIG. 4, as will be more fully discussed hereinafter.

As best seen in FIGS. 2 and 3, the one end of the reel shaft 22 extends outwardly through the adjacent leg 40 into a spring housing 57 and is attached to a spiral spring, not shown, so that the reel 20 is normally biased in the belt winding direction to store the belt on the reel and pull the belt taut against the seated occupant.

Referring to FIGS. 1 and 3, it is seen that a pendulum support 56 spans the distance between the housing side walls 14 and 16 and has an aperture 58 which receives the stem 60 of a pendulum assembly 62. The pendulum assembly 62 has a cap 64 which mushrooms outwardly to engage the pendulum support 56. A weight 66 is attached to the lower end of the stem 60. The pendulum assembly 62 normally hangs in the vertically depending position of FIGS. 1 and 3 but swings to an inclined position when a predetermined level of vehicle deceleration is experienced.

A lockbar 68 extends into triangular apertures 70 in the housing side walls 14 and 16 so that the lockbar 68 is mounted for pivotal movement. The lockbar 68 rests upon the cap 64 of the pendulum assembly 62 to normally support the lockbar 68 at the rest position of FIG. 1. An inertia stimulus tilts the pendulum assembly 62 and in so doing raises the lockbar 68 to the position of FIG. 4 for engagement with the teeth 28 of the ratchet plates.

Figure 4:
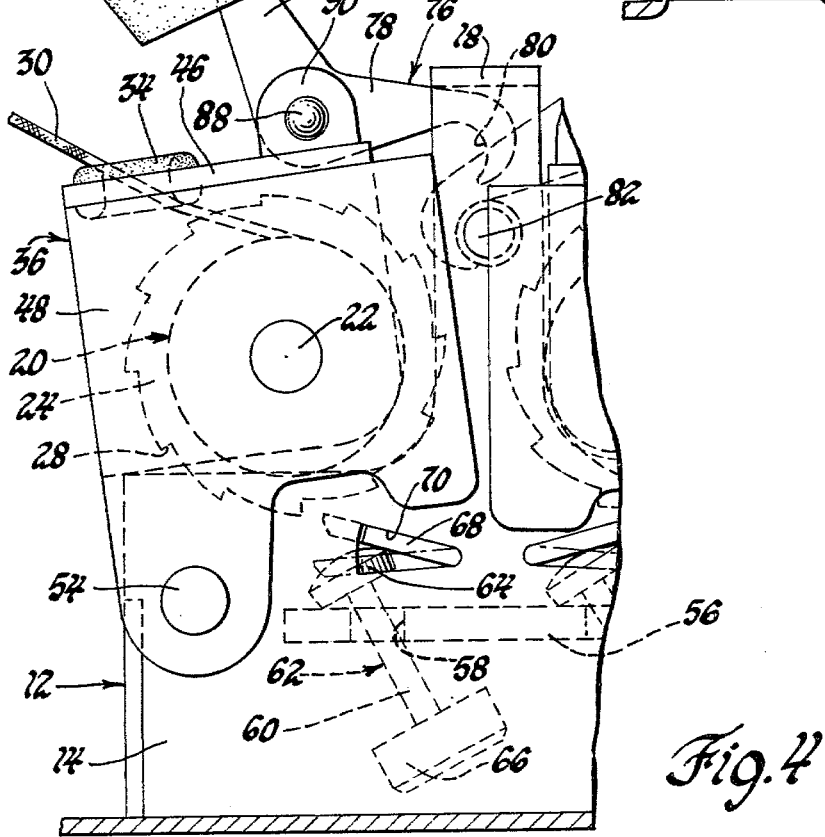
FIG. 4 is a partial view similar to FIG. 1 but showing the latch release to permit movement of the reel away from engagement with the lockbar.

Referring again to FIGS. 1 and 3, it is seen that a latch hook 76 is provided for latching the reel support member 36 relative the retractor housing 12. As best seen in FIGS. 1 and 4, the latch hook 76 is generally L shaped including a latch leg 78 having a recess 80 which is adapted for latching engagement over a latch pin 82 which extends between the housing side walls 14 and 16. The latch hook 76 also includes a handle leg 84 having a knob 86 attached thereto. A pivot pin 88 attaches the latch hook 76 to an upstanding tab 90 of the support member 36.

Referring to FIG. 1, the latch hook 76 is shown in its normal position in which the recess 80 receives the latch pin 82 to prevent outward pivotal movement of the support member 36 about the pivot pins 54 and 55. As seen in FIG. 1, the reel 20 is established in a normal position relative the lockbar 68 so that the lockbar will engage the ratchet teeth of the ratchet plates when raised to the FIG. 4 position by the inertia sensing pendulum assembly 62.

Referring to FIG. 4, it is seen that pivotal movement of the latch hook 76 to the unlatched position by occupant effort applied to the knob 86 raises the latch hook 76 out of engagement with the latch pin 82. Accordingly, the belt load imposed on the reel urges outward pivotal movement of the support member 36 and carries the ratchet plate 24 away from the lockbar 68 to release the reel 20 for belt unwinding rotation.

Thus, it is seen that the invention provides a new and improved manually operated mechanism by which the seat belt reel may be moved away from locking engagement of a lockbar to permit unwinding of the belt.

While the invention has been disclosed primarily in terms of the specific embodiment shown in the drawings, it is not intended to be limited thereto but rather only to the extent set forth in the appended claims. For example, it is within the scope of the invention to associate the latch hook 76 with the handle provided in U.S. Pat. No. 4,153,274, Lloyd W. Rogers, Jr. et al, issued May 8, 1979, so that travel of the handle beyond the degree of rotation employed to manually set the winding prevention mechanism is effective to rotate the latch hook 76 to the disengaged position of FIG. 4.

The embodiments of the invention in which an exclusive property or privilege is claimed are defined as follows:

1. In a seat belt retractor having a housing, a belt reel journaled for belt winding and unwinding rotation, a ratchet plate carried by the reel, and a lockbar selectively movable relative the housing between a locking position engaging the ratchet plate to lock the reel against belt unwinding rotation and an unlocking position disengaged from the ratchet plate to permit belt unwinding reel rotation, the improvement comprising:

a support member having the reel rotatably journaled thereon;

pivot means mounting the support member on the frame, and being spaced from the reel shaft to permit arcuate movement of the reel about the pivot means;

latch means acting between the support member and the housing to normally latch the support member at a position establishing the ratchet plate of the reel in proximity with the lockbar for selective locking engagement by the lockbar;

and means operable to unlatch the latch means whereby occupant restraining belt load acting on the reel urges arcuate movement of the support member and reel about the pivot means and away from proximity with the lockbar to permit belt unwinding reel rotation irrespective of the lockbar being located at the locking position.

2. In a seat belt retractor having a housing, a belt reel journaled for belt winding and unwinding rotation, a ratchet plate carried by the reel, and a lockbar selectively movable relative the housing between a locking position engaging the ratchet plate to lock the reel against belt unwinding rotation and an unlocking position disengaged from the ratchet plate to permit belt unwinding reel rotation, the improvement comprising:

a support member having the reel rotatably journaled thereon;

pivot means mounting the support member on the frame, said pivot means spaced from the reel shaft to permit arcuate movement of the reel about the pivot means;

a latch hook pivotally mounted on the support member and normally engageable with the housing to establish the support member at a position establishing the ratchet plate of the reel in proximity with the lockbar for selective locking engagement by the lockbar;

said latch hook having an associated manually actuable handle means by which the latch hook may be pivoted to disengage the housing whereby the occupant restraining belt load acting on the reel urges arcuate movement of the reel about the pivot means and away from proximity with the lockbar to permit belt unwinding reel rotation irrespective of the lockbar being located at the locking position.

* * * * *